INVENTOR:
PHILIP HENRY EVANS
BY Kurt Kelman
AGENT

INVENTOR:
PHILIP HENRY EVANS
By Kurt Kelman
AGENT

INVENTOR:
PHILIP HENRY EVANS
BY Kurt Kelman
AGENT

United States Patent Office 3,450,323
Patented June 17, 1969

3,450,323
TAPE-PLAYING APPARATUS

Philip H. Evans, Wollaston, Stourbridge, England, assignor to BSR Limited, Old Hill, England, a British company Filed Sept. 12, 1967, Ser. No. 667,232
Int. Cl. B65h *17/22;* G11b *15/32*
U.S. Cl. 226—176 10 Claims

ABSTRACT OF THE DISCLOSURE

Apparatus for playing tape provided in a cartridge wherein the cartridge is releasably engageable with a transporter means which moves the cartridge towards and away from its operative position wherein the tape is resiliently urged into contact with a capstan spindle, the transporter means is driven from the capstan and the capstan is disengaged from driving engagement with the transporter means in the operative position.

BACKGROUND OF THE INVENTION

*Field of the invention*

This invention relates to apparatus for reproducing sound from pre-recorded magnetic tape of the kind in which the pre-recorded tape is provided in a holder generally known as a cartridge or cassette, in which the tape is coiled on a reel mechanism in such manner that it can be uncoiled, transported past an opening in the cartridge or cassette and then recoiled within the cartridge or cassette. Such a loaded cartridge is used in playback apparatus in which, when the cartridge is introduced, the tape makes contact with the magnetic sound reproducing head as the tape is transported past the opening in the cartridge and the motion of the tape is obtained by means of a rotary driving member such as a spindle, generally known as a capstan spindle, which engages the outwardly presented face of the tape in co-operation with a rotary pressure roller or the like engaging the inwardly presented face of the tape, such rotary pressure roller being mounted within the cartridge. The capstan spindle is driven by a heavy flywheel, generally known as a capstan, which ensures that the capstan spindle rotates at a constant speed.

DESCRIPTION OF THE PRIOR ART

In order to ensure that the tape is gripped tightly between the capstan spindle and the rotary pressure roller it is necessary for the pressure roller mounted on the cartridge to be resiliently and strongly urged into contact with the capstan spindle. This has been achieved by urging the cartridge bodily towards the capstan spindle by means of a relatively strong spring catch means with which the cartridge has to be engaged with on loading and disengaged from on unloading and, therefore, considerable force has to be overcome when loading a cartridge into and unloading a cartridge out of the tape-playing apparatus.

A tape-playing apparatus of the type described in the preceding paragraphs will be referred to herein after as "of the type described."

A tape-playing apparatus of the type described is often used in motor vehicles where it is essential for the driver to be able to insert and withdraw a cartridge from the apparatus with the minimum of effort so that his concentration on driving is not interrupted.

Thus, the need to overcome the strong spring force of the spring catch means, is a disadvantage of tape-playing apparatus of this type, and it is the object of the present invention to provide an improved tape-playing apparatus of the type described wherein this disadvantage is overcome.

SUMMARY OF THE INVENTION

According to the present invention there is provided a tape-playing apparatus of the type described wherein the cartridge is movable between an operative position wherein the tape passing over the pressure roller is resiliently urged into contact with the capstan spindle, and an inoperative position wherein the tape is spaced from the capstan spindle, and including transporter means releasably engageable with a cartridge to move the cartridge, the transporter means being driven from the capstan and the capstan being free from said transporter means in the inoperative and operative positions of the cartridge, and means acting on the cartridge in said operative position to urge the tape against the capstan spindle.

BRIEF DESCRIPTION OF THE DRAWINGS

A tape-playing apparatus according to the present invention will now be described in more detail by way of example with reference to the accompanying drawings wherein.

DESCRIPTION OF THE PREFERRED EMBODIMENT

In order to avoid unnecessary prolix description only the construction of the transporter means and its associated parts will be described in detail herein, other parts of the tape-playing apparatus merely being mentioned briefly so that the invention may be fully understood, it being appreciated that those other parts of the apparatus do not form part of the present invention.

Figure 1:
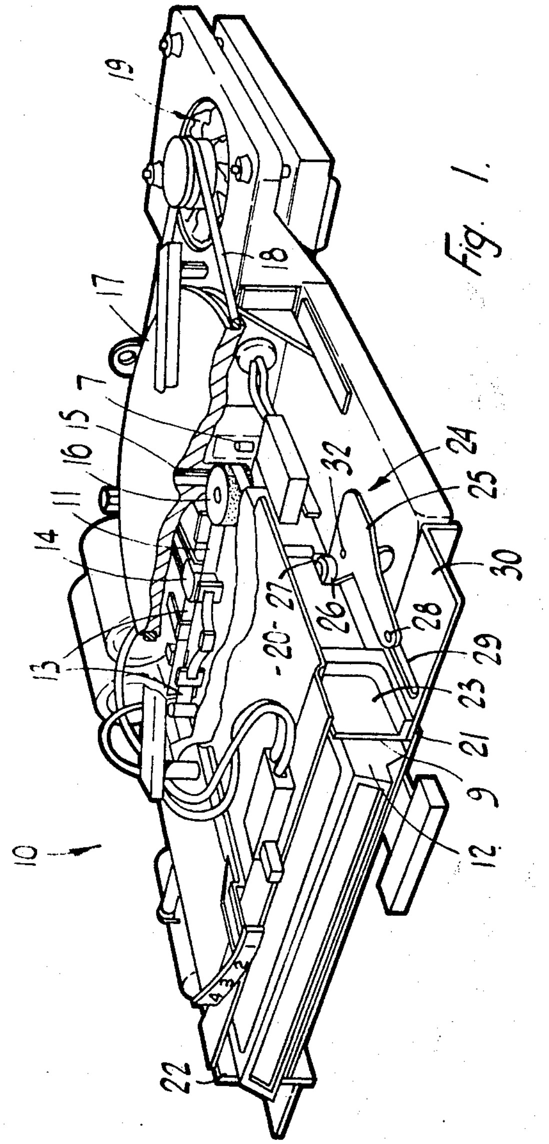
FIGURE 1 is a perspective view of a tape-player embodying the invention with the outer casing removed and with part broken away, and taken from above, the front and to one side.
Figure 2:
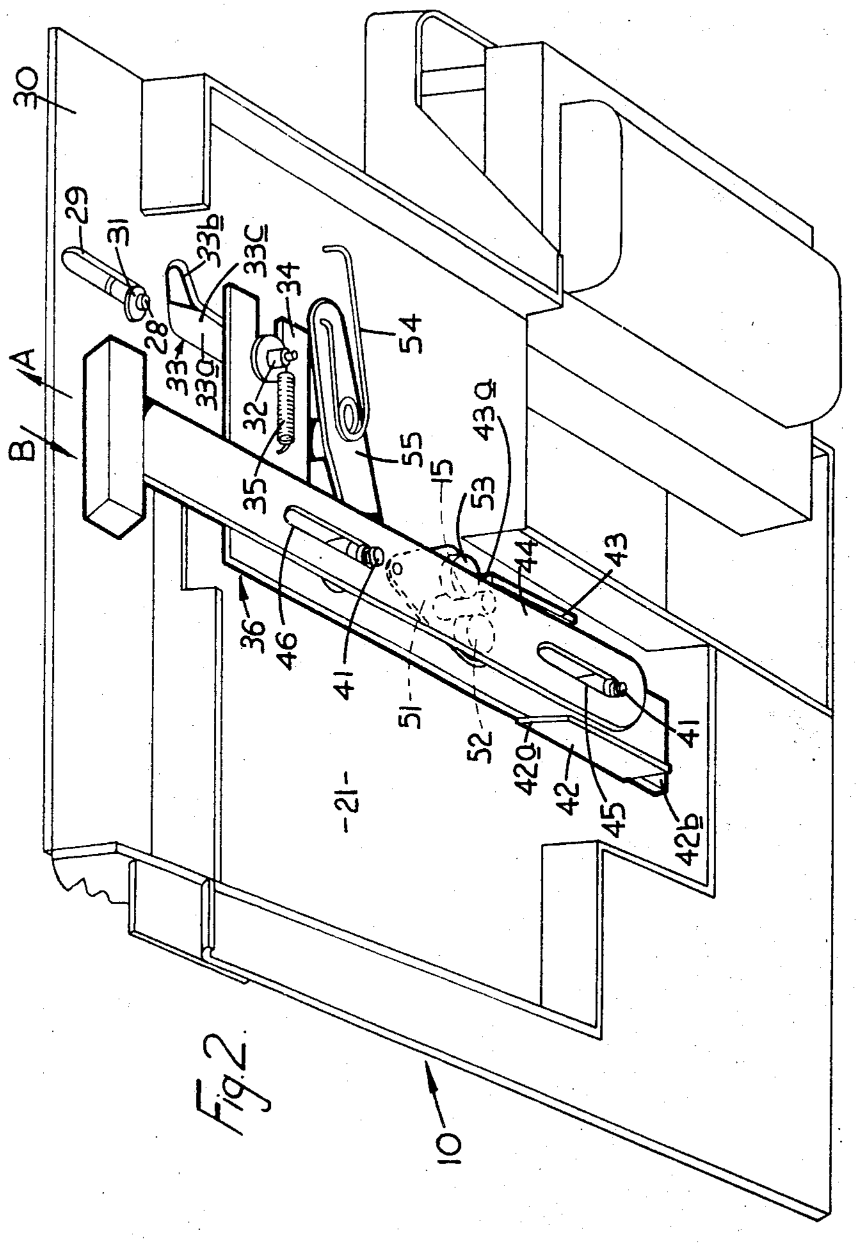
FIGURE 2 is another perspective view of the apparatus of FIGURE 1 taken from below, the front and to the other side, and, FIGURE 3 is a detail exploded perspective view of the main slide plate.

The tape-player is illustrated generally at 10 in FIGURES 1 and 2 and comprises a pre-recorded tape 11 provided in a holder 12 generally known as a cartridge, in which the tape is coiled on a reel mechanism, not shown, transported past openings 13 in the cartridge 12 and then recoiled within the cartridge. The cartridge is arranged to be slidably loaded into a cartridge receiving cavity 9 in the apparatus 10 and suitable catch means are provided to hold the cartridge 12 in position and to resiliently urge it inwardly of the apparatus 10. When the cartridge 12 has been loaded into the apparatus 10 it is engaged with the transporter means which moves it between its inoperative position and an operative position wherein the cartridge 12 is urged strongly and resiliently inwardly of the apparatus so that the tape 11 makes contact with a magnetic sound reproducer head 14 as the tape is transported past the openings 13 in the cartridge 12 and the motion of the tape is derived from a capstan spindle 15 against which the outwardly presented face of the tape 11 is resiliently urged by means of a rotary pressure roller 16 which is engaged with the inwardly presented face of the tape, which pressure roller is mounted permanently within the cartridge 12. The capstan spindle 15 is rotatably mounted in the apparatus 10 on bearings, not shown, and is non-rotatably connected to a heavy flywheel or capstan 17 which is driven by a flexible band 18 from an electric motor 19.

The above description forms a very brief description of a cartridge type of a tape-playing apparatus to which the present invention is applied and the features which provide the present invention will now be described in more detail.

The cartridge receiving cavity 9 is of generally rectangular parallelopiped shape and has opposed, spaced apart, top and bottom walls 20 and 21, a side wall 22 extending normally therebetween at one side thereof, and an apertured opposite side wall 23. The side wall 22 is provided with three rollers, not shown, rotatable about a vertical axis and arranged to engage with one side of the cartridge 12 when it is loaded into the apparatus. The top and bottom walls 20 and 21 also engage the cartridge 12 but are not provided with rollers. An abutment stud 7 carried by a main slide plate, hereinafter to be described, projects into the cavity 9 adjacent its inner end through a slot in the bottom wall 21 and is arranged to abut against the apertured end wall of the cartridge 12. A catch means 24, comprising a bell crank lever 25 having a roller 26 mounted at the free end of one limb thereof is mounted on the apparatus so that the roller 26 projects through an aperture in the wall 23 and engages with the conventional V-shaped recess 27 in the side of the cartridge 12, whilst the other limb of the lever 25 lies generally parallel to the side of the cavity 9. The roller 26 of bell crank lever 25, as hereinafter to be explained, resiliently engages the cartridge 12 and tends to urge the cartridge 12 towards the wall 23 and it is for this reason that the rollers are provided so that the cartridge 12 slides easily within its cavity.

At the free end of the other limb of the lever 25 there is provided a downwardly depending pin 28 which passes through a narrow slot 29 formed in a fixed part 30 of the apparatus and which extends parallel to the side walls 22, 23 of the cartridge receiving cavity 9. A circlip 31, see FIGURE 2, is engaged in a groove in the pin 28 to hold the lever 25 in position.

At the junction between the two arms of the bell crank lever 25 a further downwardly depending pin 32 is provided which projects through a further slot 33. The part of the pin 32 projecting through the slot 33 is engaged between the arms of a fork member 34 and a coil tension spring 35 is connected between the pin 32 and the member 34 to urge the pin 32 into engagement with the base of the fork member. The slot 33 includes a first, abutment portion **33*a* which extends parallel to the side walls 22, 23 of the cartridge receiving cavity 9, and a second, release portion 33*b* which extends generally perpendicularly away from the adjacent side wall 22**.

The fork member 34 is formed integrally with a main slide plate 36, as hereinafter to be described, and as the main slide plate moves back and forth parallel to the sides 23, 22 between its operative and inoperative positions then the fork member 34 will cause the bell crank lever 25 to also slide back and forth and as the roller 26 thereof is engaged with the recess 27 of the cartridge 12 the cartridge will also be moved back and forth between its operative and inoperative positions.

When the main slide plate 36 is in the inoperative position, i.e. is closest to the front of the cartridge receiving cavity 9 the pin 32 is aligned with the release part **33*b* of the slot and so the bell crank lever 25 can pivot about the pin 28 and so the roller 26 can move laterally out of the recess 27 to enable a cartridge to be unloaded from or loaded into the apparatus. When the main slide plate 26 is moved inwardly of the apparatus to the operative position the pin 32 is prevented from outward lateral movement away from the recess 27 by engagement with an abutment edge 33*c* of the abutment part 33*a* of the slot 33 and so the roller 26 is held positively within the recess 27**.

The catch means 24 serves only to hold the cartridge 12 relative to the main slide plate 36 and does not itself move the cartridge 12 between its operative and inoperative positions and so does not require any considerable spring pressure. The strength of the spring 35 needs only to be sufficient to urge the roller 26 into the recess 27, the roller 26 being held within the recess 27 by virtue of engagement with the side **33*c* of the slot 33, and thus very little spring pressure has to be overcome to enable the cartridge 12 to be loaded into, or unloaded from, the apparatus 10. The effort required to move the cartridge between its inoperative position and its operative position, wherein the tape is urged strongly against the capstan spindle, is provided by the movement of the main slide plate 36** which is communicated to the cartridge by the catch means.

The main slide plate 36 which provides the transporter means of the present invention will now be described, referring particularly to FIGURES 2 and 3.

Figure 3:
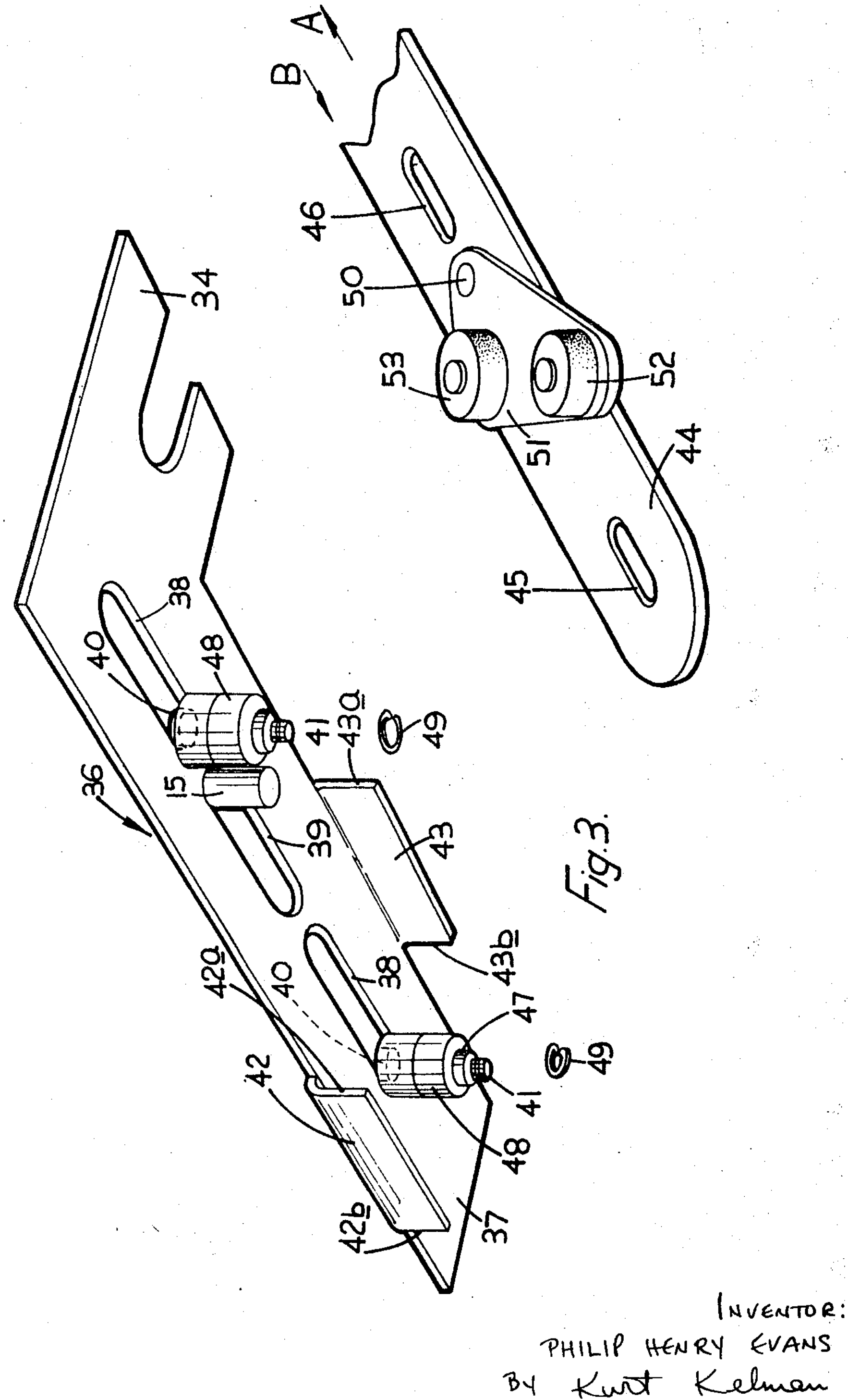

The main slide plate 36, shown in FIGURE 3, is generally L-shaped in plan view and the shorter limb of the L provides the fork member 34. The main slide plate 36 is arranged to slide on the frame of the tape-playing apparatus beneath the bottom 21 of the cartridge receiving cavity 9 with its longer limb 37 extending in the direction of movement of the cartridge 12.

The longer limb 37 of the main slide plate is provided with three-coaxial elongated slots 38 and 39, the two end slots 38 being provided to accommodate two rollers 40 provided on the spindles 41 secured to the underside of the bottom wall 21 of the cartridge receiving cavity 9 to ensure that the main slide plate 36 slides in the longitudinal direction of the cavity 9 i.e. in the direction of introduction and removal of the cartridge 12. The central slot 39, of the three slots, is sufficiently wide to accommodate, with clearance, the lower end of the capstan spindle 15.

The longer limb 37 on each side thereof is provided with upstanding flanged portions 42, 43 and these flange portions are of limited extent and do not extend along the whole length of each side and they are staggered longitudinally so that the end **42*a* of the flange 42 on one side is roughly in line with the centre point of the flange portion 43 on the other side of the longer limb 37**.

An actuating slide 44, generally rectangular in plan view and provided with two elongated slots 45, 46 is slidably mounted on the spindles 41 at a position spaced slightly below the main slide plate 36 by means of guide rollers 47 mounted on the spindles 41 and engaged within the slots 45, 46, there bing collar members 48 positioned around the spindles 41 between the main slide plate 36 and the actuating slide 44. Circlips 49 are provided on the spindles 41 below the actuating slide 44 to maintain it in position on the spindles 41. Between the two slots 45, 46 in the actuating slide 44 and co-axial therewith at a position spaced slightly away from the inner end of the slot 46 which is closest to the opening of the cartridge recess there is provided a pivot pin 50 for a pulley carrier plate 51.

The pulley carrier plate 51 is of generally triangular form, the pivot pin 50 being provided adjacent one apex of the triangle and rubber pulleys 52, 53 are rotatably mounted at the other two apices thereof. The separation of the axes, and the diameter of the pulleys 52, 53 is arranged so that as the actuating slide 44 is moved to and fro in its longitudinal direction the rubber pulleys 52, 53 are moved past the capstan spindle 15 and when one of the pulleys 52, 53 is in engagement with the spindle 15 the other pulley 52, 53 is just out of engagement therewith. The diameter of the pulleys 52, 53 is also chosen so that when a pulley 52, 53 is in engagement with the capstan spindle 15 the flange member 42 or 43 respectively formed on the main slide plate 36 is also engaged by the pulley 52, 53 on the opposite side thereof as is engaged by the capstan spindle 15.

A toggle spring 54 of conventional shape to provide an "over dead centre action" is provided between the body of the top of the tape-playing apparatus 10 and one end of a pivoted lever 55 which is pivotally connected at its other end to the main slide plate 36 so that the main slide plate 36 is urged either towards or away from the capstan spindle by the toggle spring 54. The drive provided by the capstan spindle 15 through the rubber pulleys 52, 53 being provided to move the main slide plate 36 over the dead-centre position of the toggle spring 54.

In use, assuming that the cartridge is in its operative position, the actuating member 44 is moved in its longitudinal direction towards the outside of the apparatus, i.e. in the dirtction of the arrow A, and this causes the rubber pulley 52 to be moved into engagement with the capstan spindle 15 and, assuming that the capstan spindle is rotated clockwise in FIG. 2, then the rubber pulley 52 would be rotated anti-clockwise and hence the left-hand edge of the pulley, as seen in FIGURE 2, will be moving in a direction from the front to the middle of the apparatus. In addition, as the actuating member 44 is moved as described above it causes the above mentioned rubber pulley 52 to engage with the one end **42*b* of the upturned flange 42 and thus as the pulley 52 is rotated anti-clockwise this will cause the flange 42 which is engaged with the pulley 52 to be moved in the direction to move the cartridge 12 into contact with the capstan spindle 15,** i.e. into its operative position. FIGURE 2 shows the main slide plate at this stage.

When the main slide plate 36 has been moved until the trailing end **42*a* of the flange 42 moves out of engagement with the pulley 52 the toggle spring 54, having been thus moved over its dead-centre position, continues to move the main slide plate 36 and hence the pressure roller 16 carried by the cartridge 12 is forced resiliently into engagement with the capstan spindle 15 whilst the roller 52 is disengaged from the capstan spindle 15.**

When it is desired to move the cartridge to its inoperative position and hence remove the pressure roller 16 of the cartrdge 12 out of engagement with the capstan spindle 15, the actuating slide 44 is pushed inwardly in the direction of the arrow B, so that the pulley 53 is moved into engagement with the capstan spindle 15 and hence is rotated anti-clockwise, and is also moved into engagement with the end **43*a* of the flange 43 on the main slide plate 36 an thus the main slide plate 36 is driven in the direction to remove the pressure roller 16 of the cartridge 12 out of engagement with the capstan spindle 15.**

The pivotal mounting of the pulley carrier 51 on the spindle 50, allows slight side ways movement of the pulleys 52, 53 which ensures that a good contact is achieved both with the capstan spindle 15 and with the flanges 42 or 43 since the pulleys 52 or 53 "float" between the capstan spindle 15 and its associated flange 42 or 43, and a grab effect on the pulleys 52, 53 is achieved so that each pulley is tended to be pulled between the capstan spindle 15 and its associated flange 42 or 43.

It will, therefore, be appreciated that the capstan, through the capstan spindle 17, is only providing drive for the cartridge for a short distance whilst the cartridge is moved up to and sent past the dead-centre position of the toggle spring 54. The capstan being completely free from driving the cartridge when the cartridge is in its operative and inoperative positions.

It will also be appreciated that, if desired, only one of the rubber uplleys 52 or 53 may be provided if it is only desired that a drive must be used to move the cartridge in one direction. For example, it is relatively easy to load the cartridge manually into the cavity 9 to firstly engage it with the catch means 24 and then move the cartridge and main slide plate over the "dead centre position" of the toggle spring 54 into the operative position of the cartridge. It is, however, considerably more difficult to withdraw the cartridge from this operative position, as there is no convenient position of the cartridge to grip, manually, and it would be necessary to provide the drive above mentioned to move the main slide plate from the operative to the inoperative position and in this case only the roller 52 would be provided.

I claim:

1. In tape-playing apparatus of the type described, the improvement wherein the cartridge is movable between an operative position wherein the tape passing over the pressure roller is resiliently urged into contact with the capstan spindle and an inoperative position wherein the tape is spaced from the capstan spindle, and including transporter means releasably engageable with a cartridge to move the cartridge, the transporter means being driven from the capstan and the capstan being free from driving engagement with said transporter means in the inoperative and operative positions of the cartridge, and means acting on the cartridge in said operative position to urge the tape against the capstan spindle.

2. The improvement according to claim 1, wherein the transporter means moves the cartridge from said operative position to said inoperative position.

3. The improvement according to claim 2, wherein the transporter means moves the cartridge from said inoperative position to said operative position.

4. The improvement according to claim 3, wherein said means acting on the cartridge in said operative position is a toggle spring connected to the transporter means, the transporter means being moved over the dead centre position thereof by the drive from the capstan and the toggle spring acting on the transporter means in both said operative and inoperative positions, to urge the transporter means in opposite directions.

5. The improvement according to claim 4, wherein an abutment part of the transporter means lies parallel to the direction of movement thereof and spaced from the capstan spindle, a pulley or pulleys being movable into the gap between the capstan spindle and said part to communicate the rotation of the spindle to said part to drive the transporter means.

6. The improvement according to claim 5, wherein two abutment parts are provided on opposite sides of the capstan spindle and two pulleys or sets of pulleys are provided, each pulley or sets of pulleys being movable selectively into the associated gap between the capstan spindle and abutment parts.

7. The improvement according to claim 6, wherein the or each pulley, or sets of pulleys is, or are, mounted on an actuating member slidable to and fro parallel to the direction of movement of the transporter means to move the or each pulley or sets of pulleys into the gap or gaps between the capstan spindle and abutment part or parts.

8. The improvement according to claim 7, wherein movement of the actuating member in one direction moves one pulley or sets of pulleys into the gap between the capstan spindle and one abutment part whilst movement in the other direction moves the other pulley or sets of pulleys into the gap between the capstan spindle and the other abutment.

9. The improvement according to claim 8, wherein each pulley or sets of pulleys are mounted on a carrier plate which is pivotally mounted on an actuating member for movement about an axis parallel to the capstan spindle so that the pulley or sets of pulleys may center themselves as they pass through their associated gap.

10. The improvement according to claim 9, wherein the abutment parts are planar surfaces arranged parallel to each other and to the capstan spindle and in staggered relationship with the overlapping ends terminating with the end face of one surface at approximately the mid-point of the other surface and vice versa.

References Cited

UNITED STATES PATENTS

| | | | |
|---|---|---|---|
| 3,343,687 | 9/1967 | Deighton et al. | 242—55.13 X |
| 3,372,884 | 3/1968 | Nagano | 242—55.13 |
| 3,395,871 | 8/1968 | Akerman et al. | 242—55.13 |

ALLEN N. KNOWLES, *Primary Examiner.*

U.S. Cl. X.R.

242—55.13